United States Patent Office 3,364,358
Patented Jan. 16, 1968

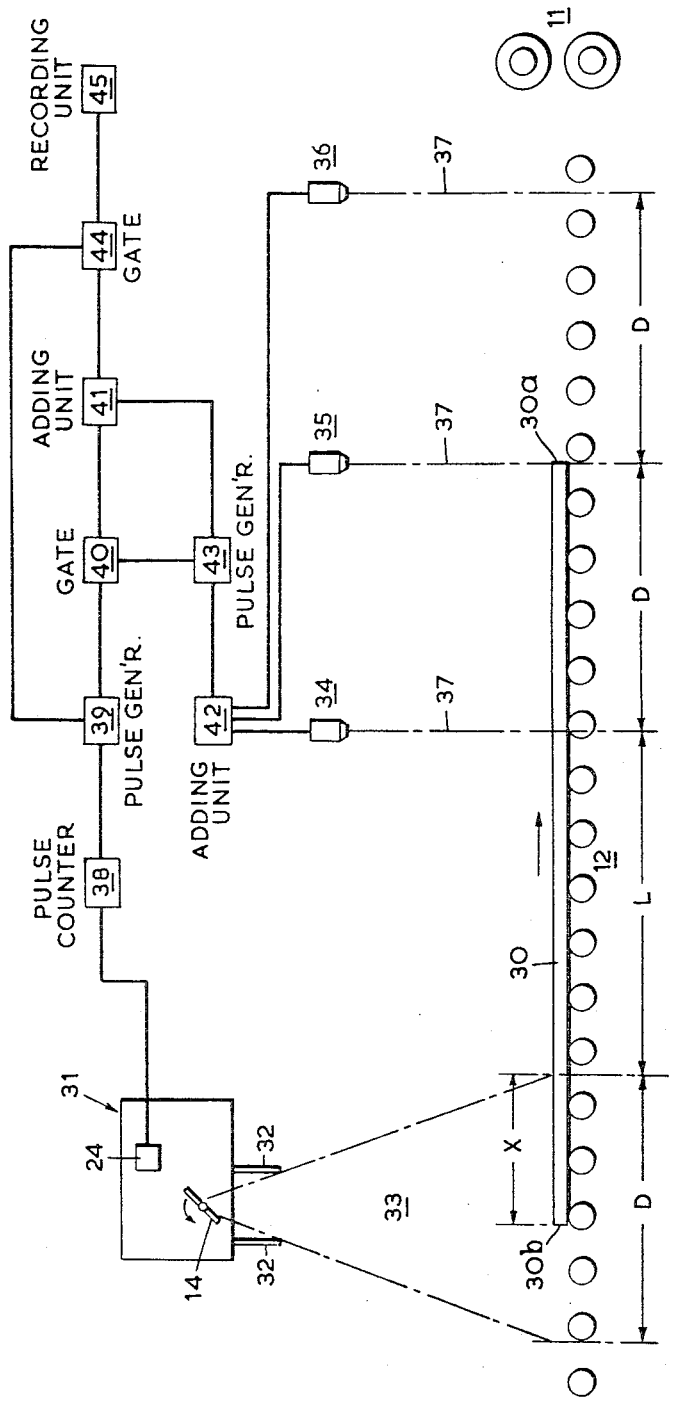

3,364,358
MEASURING APPARATUS FOR MEASURING A
LINEAR DIMENSION OF A BODY
James Clive Ashworth, Ashton-on-Mersey, Sale, England,
assignor to The English Electric Company Limited,
London, England, a British company
Continuation of application Ser. No. 264,442, Mar. 11,
1963. This application Jan. 5, 1967, Ser. No. 607,579
Claims priority, application Great Britain, Mar. 15, 1962,
9,994/62
3 Claims. (Cl. 250—219)

ABSTRACT OF THE DISCLOSURE

Apparatus for measuring a linear dimension, such as the length of a hot steel strip in a rolling mill, comprising a rotating mirror scanning the strip and reflecting radiation therefrom over that part of its rotation in which the strip is in view to a photocell whose output gates the output of a second photocell. The latter receives light pulses generated by a grating, or the like, from a beam reflected from a light source by a second mirror rotating with the first mirror. A pulse counter receives the gated output pulses which represent the length measured.

Figure 1:
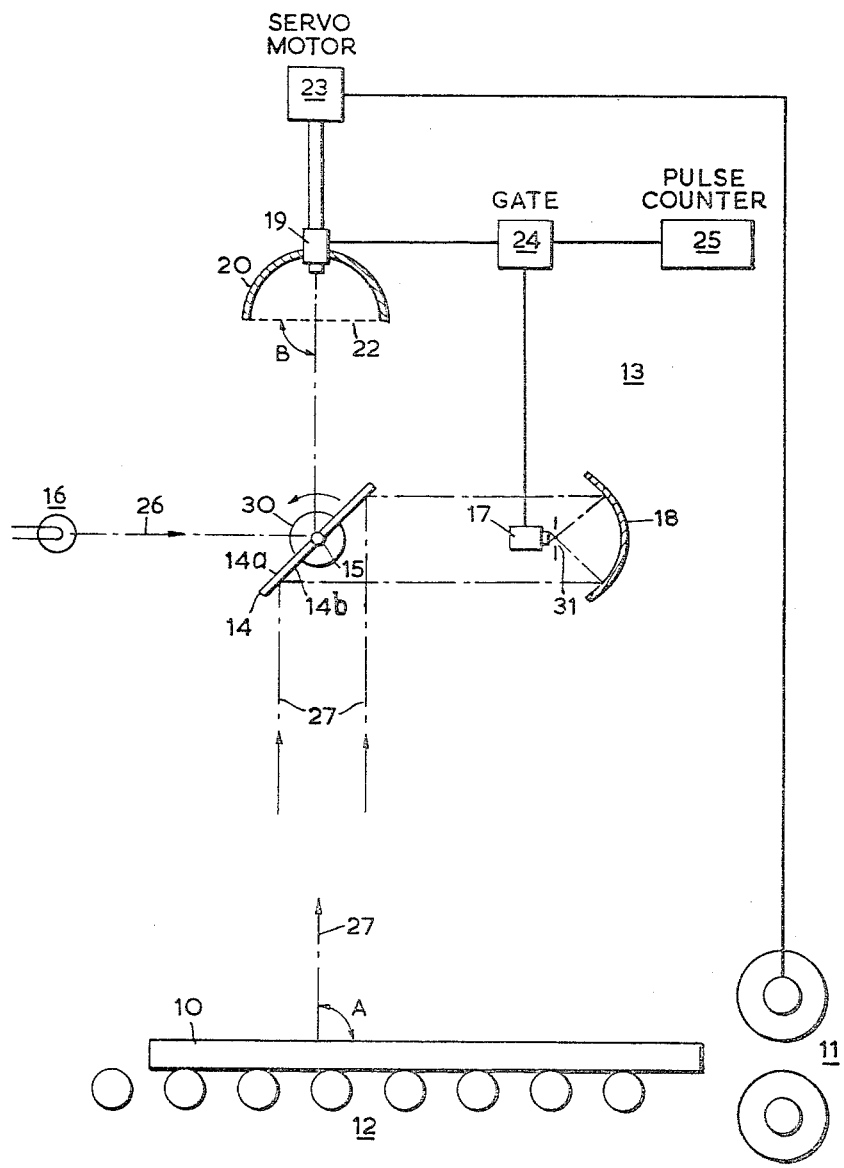

In a modification for measuring very long dimensions, fixed photocells view points on, or in the path of, the strip; the mirror scans a limited distance equal to the spacing between the fixed photocells, so that the total length is a function of the length of the strip within said fixed distance and the number of fixed photocells viewing the strip.

---

This application is a continuation of Ser. No. 264,442, filed Mar. 11, 1963, and now abandoned.

This invention relates to apparatus for measuring a linear dimension of a body.

According to the invention, such apparatus includes sensing means for giving an electric output in response to radiation from the body, rotatable reflecting means for scanning a linear path and for reflecting the said radiation, when the said path intersects the surface of the body, towards the sensing means for a period of time dependent on the length of that portion of the scanned path which intersects the surface of the body, means for rotating the reflecting means at constant speed, and signal-producing means responsive to the electrical output of the sensing means to produce an output signal dependent on the said period of time.

According to a preferred feature of the invention, the apparatus also includes pulse-generating means for supplying regular electric pulses to the signal-producing means, the pulse-generating means being synchronised with the means for rotating the reflecting means so that successive pulses correspond with equal increments in the path scanned by the reflecting means, and the signal-producing means include pulse-counting means for counting the said pulses and for producing said output signal in response thereto, and switch means responsive to the electrical output of the sensing means for interrupting the supply of pulses to the pulse-counting means.

According to another preferred feature of the invention, the pulse-generating means comprise a source for producing a continuous beam of radiation, interrupting means for interrupting the said beam so as to create intermittent regular pulses of radiation, rotatable transmitting means for transmitting the continuous beam of radiation to the interrupting means for a predetermined time and synchronised with the said reflecting means so that the said predetermined time corresponds to the scanning of a particular portion of the said path by the said sensing means, and second sensing means responsive to the said intermittent pulses to produce correspondingly the said regular electric pulses.

Preferably the interrupting means comprise a screen having alternate relatively opaque and translucent portions, the said rotatable transmitting means being arranged to sweep the continuous beam of radiation across the screen transversely to the said opaque and translucent portions so as to produce the said intermittent pulses as the beam passes through the translucent portions.

The said reflecting means may be arranged to scan a path on the surface of the body between one end thereof and a predetermined fixed position.

According to a further preferred feature of the invention, where the said reflecting means are so arranged, the apparatus includes a further sensing means sensitive to radiation from the body and arranged operatively in the same plane as the viewing plane of the said reflecting means for viewing a point on a co-linear extension of a scanned path at a fixed distance from the said predetermined position, and the said counting means is operative to produce a continuous first electric signal dependent on the length of the path scanned by the first reflecting means, the signal-producing means further including means effective to produce, when the other end of the body is visible to the said further sensing means, a second electric signal dependent on the length of the body along the said linear extension of the said path between the said other end and the said further sensing means, and adding means responsive to the said first and second signals for producing a signal dependent on the sum thereof.

Apparatus in two forms according to the invention, for measuring the length of a hot steel plate on a roller table forming part of a rolling mill installation, will now be described by way of example and with reference to the accompanying drawings, of which:

FIG. 1 is a diagrammatic elevation showing the apparatus in one form in relation to the installation, and FIG. 2 is a diagrammatic elevation showing the apparatus in another form in relation to the installation.

With reference now to FIG. 1, a steel plate 10 to be rolled in a mill 11 rests on a roller table 12 along which it is moved lengthways on successive rolling passes by the action of the mill. A measuring unit generally indicated at 13, for measuring the length of the plate 10 as the latter passes under the unit 13, is mounted in the roof of the building which houses the rolling mill installation.

A double-sided mirror 14 is rotatably mounted directly above the roller table 12 and a synchronous motor 30 is arranged to rotate the mirror 14 at constant speed about a shaft 15. Level with the axis of the shaft 15 are a light source 16 and a first sensing device comprising a photosensor 17, the latter being mounted so as to receive radiation from a parabolic mirror 18 which is in a fixed position relative to the axis of shaft 15. This radiation passes through a slit 31 mounted at the focal point of the mirror 18.

A second sensing device, comprising a photosensor 19, is mounted vertically above the mirror 14, in a hemispherical box 20 which is open at its lower end, the inside surface of the box 20 being of a light colour. A horizontal opaque glass screen 22 is mounted in the open end of the box. The screen 22 carries a number of equally-spaced transverse translucent parallel lines separated by lines substantially more opaque than the said translucent lines. The box 20 is mounted so that light from the mirror 14 can pass through the screen 22 into the box 20. The latter is movable vertically by means of a servomotor 23, which is operated from the control system for the mill 11 and in dependence on the height of the upper roller of the mill 11 above a predetermined datum.

The light source 16, the upper face 14a (as seen in the drawing) of the mirror 14, screen 22 and sensor 19 together constitute a device for generating electric pulses; the photosensor 19 has its output connected through a gate 24 to a counter 25, which has a visual indicator to show the length of the plate 10. The gate 24 is controlled electrically by the output signal from the photosensor 17.

In operation, as the mirror 14 is rotated by motor 30 in the direction shown by the arrow, the upper face 14a of the mirror 14, reflecting a continuous beam of light 26 from the light source 16 onto the screen 22, causes the beam 26 to sweep the screen from right to left as seen in FIG. 1, thus intermittently lighting up the light-coloured internal surface of the box 20, due to interruption of the beam by the opaque lines on the screen 22. The sensor 19, energised by the light in the box 20, is thus caused to transmit to the gate 24 a series of electric pulses corresponding to the pulses of light passing through the screen 22.

At the same time the lower face 14b of the mirror (as seen in FIG. 1) scans the roller table 12 lengthwise. The hot plate 10 gives off infra-red radiation (a beam of which is indicated at 27) which, when the plate is in the field of view of the mirror face 14b, is reflected by the face 14b onto the parabolic mirror 18 and thence through slit 31 to photosensor 17. The latter is thereby energised so as to transmit an electric signal to the gate 24. The gate 24 is arranged so as to transmit the pulses from sensor 19 to the pulse counter 25 only when there is a signal from the photosensor 17, that is to say only while the plate is in such a position that the mirror 14 can reflect radiation from the plate to the photosensor. The two faces of the mirror 14 are arranged relatively to each other in such a way as to ensure geometrical similarity between the two optical systems of which each face respectively forms a part. The two faces of mirror 14 may be substantially similar, so that pulses may be received twice in every revolution of the mirror by the pulse counter 25. The gate 24 may on the other hand be so arranged that it only allows pulses to be transmitted to the counter once in every revolution, i.e. only when either face 14a or 14b of the mirror is scanning the plate 10.

As the mirror 14 rotates, the length of each portion of the scanned path represented by successive equal increments of angle of rotation of the mirror decreases, until a vertical beam is received by the mirror and reflected by it towards the parabolic mirror 18, after which the length of each successive portion of the scanned path increases. Also, since the translucent portions of the screen 22 are equally-spaced, the frequency of the intermittent light in the box 20, and hence of the electric pulses from the sensor 19, decreases in the same way until the beam 26 is reflected vertically by the mirror 14, after which the frequency increases. Thus, since the beams 26 and 27 are co-linear and the screen 22 and plate 10 are parallel, successive equal increments of length on the path scanned by the mirror face 14b are represented by equal numbers of pulses. The number of pulses counted by the counter 25 is thus directly proportional to the length of the plate 10. The visual indication on the counter unit shows the length so measured.

As the plate 10 decreases in thickness due to rolling in the mill, the distance along the plate scanned by the mirror 14b, during rotation of the mirror through a given angle, increases. The servomotor 23 compensates for this, by raising the box 20 and the components attached to it so as to increase the distance between the mirror 14a and the screen 22 in proportion to the increase in distance between the plate 10 and the mirror 14a.

The counter 25 may also be used to operate control means for automatically stopping the mill when the plate 10 has been rolled to the required length, or to operate a warning device. The measuring unit 13 may also be used to measure any desired dimension of the plate other than its length; for example, to measure the width of the plate 10 the unit 13 may be mounted for turning through 90° so that the mirror 14 scans a path transverse to the roller table.

Instead of the double-side mirror 14, two separate plane mirrors may be arranged to rotate simultaneously at the same speed. The two mirrors need not be parallel, provided the unit 13 is arranged so that the angle (shown at A in FIG. 1) made with the plate 10 by the beam of radiation 27 is always substantially the same as the angle of incidence (shown at B in FIG. 1) of the beam of light 26 on the screen 22; this is to compensate for the fact that equal increments in angle of mirror rotation do not represent equal increments of the paths scanned.

In one example, the two mirrors are arranged at right angles to each other on the same axis of rotation, the mirror for reflecting light from the source 16 having a substantially smaller reflecting area than that for reflecting light from the plate 10, and the former mirror being made as thin as possible. It will be understood that this mirror can be arranged so that the sensor 19 need not be mounted vertically as shown in FIG. 1, but may be arranged in any convenient position.

The mirror 18 need not be parabolic: it may for example be spherical in form.

As an alternative source of electric pulses (instead of the light 16, mirror 14a, a screen 22 and photosensor 19), an electronic oscillator may be used. As mentioned above, equal increments in angle of rotation of the mirror 14b do not represent equal increments of scanned path, so such an oscillator incorporates suitable means, synchronised with the rotation of the mirror 14, for modulating the pulse repetition rate of the oscillator so that the output pulses from the oscillator do represent equal increments of scanned path.

If the pulse source is such an oscillator, the motor 30 must be a constant speed machine such as a synchronous motor: but in an arrangement such as that shown in FIG. 1 the motor 30, though described above as a synchronous machine, may in fact be of any convenient type.

Either of the photosensors 17 or 19, or both, may be of the kinds sensitive to visible light or infra-red light. If the plate 10 is red-hot, the light thus emitted may be used to energize the photosensor 17. If both sensing devices are sensitive to visible light, light from a suitable source reflected from the plate 10 may be used to energize the photosensor 17.

The unit 13 may also be made to operate so that when there is no signal from the photosensor 17 (that is to say when the plate is not being scanned), the gate 24 causes the counter to receive pulses from the pulse generator, but not when the plate is in the field of view of the mirror 14. In this case the device would indicate the length of path scanned less the length of the plate; from which information, given the total length of the scanned path, the length of the plate could be deduced.

The plate to be measured may be very long, that is to say either end of the plate may be at a great distance horizontally from the length-measuring unit 13, so that large increments in the path scanned thereby will be represented only by relatively very small increments in the angle of rotation of the mirror 14. To improve the accuracy of measurement in such cases, a unit such as the unit 13 may be used to measure only a portion of the plate, for instance the length in excess of some predetermined amount.

With reference now to FIG. 2, for measurement of such a long plate 30 moving on the roller table 12 in the direction indicated by the arrow towards the mill 11, a length-measuring unit 31, similar to the unit 13 in FIG. 1 but without the pulse counter 25, is mounted above the roller table. Masking means, such as a pair of screens 32, are provided to limit the scanning zone of the mirror 14 to that defined by the chain-dotted lines at 33, the length of this zone along the roller table 12 being the distance shown as D in FIG. 2. A convenient number of fixed photosensors (of which three are shown in FIG. 2 at 34, 35 and 36) are mounted at equal intervals of distance D for viewing vertically downwards on to the roller table, the line of viewing of each fixed sensor being indicated by chain-dotted lines 37. The distance between the line of viewing of the photosensor 34, nearest the unit 31, and the limit of the scanning zone 33 of the latter, is indicated as L in FIG. 2.

The output side of the gate 24 in unit 31 is connected to a pulse counter 38 which produces a voltage output signal, dependent on the length (shown as X in FIG. 2) of that part of the plate 30 which is scanned by the mirror 14. This signal is fed through a pulse generator 39 and a gate 40 to form one of two inputs to an adding unit 41.

Each of the fixed sensors 34 to 36 supplies, in response to radiation emitted by the hot plate 30, an electric signal to another adding unit 42. The unit 42 supplies a voltage signal proportional to the distance $L+(n-1)D$, where $n$ is the number of fixed photosensors energized, through a second pulse generator 43, to constitute the second input to the adding unit 41.

The pulse generator 43 is arranged to supply a single pulse to the gate 40 in response to each change in the voltage output from the adding unit 42, whereby to allow the output signal from the pulse counter 38 to pass to the adding unit 41.

The adding unit 41 supplies to a gate 44 a signal dependent on the sum of its two inputs. For example, when the leading edge 30a of plate 30 passes below the fixed sensor 34, the latter is energized, the adding unit 42 produces an output signal proportional to the distance L (since $n=1$ so that $(n-1)D$ is zero in this case); and the pulse generator produces a pulse to allow gate 40 to pass to the unit 41 a signal proportional to the distance X. The output from unit 41 is then proportional to the value of $(X+L)$ at that instant. Similarly, when the edge 30a passes below sensor 35, the two fixed sensors 34 and 35 are energized so that $(n-1)D$ is equal to D. The output signal from unit 41 is therefore now proportional to the sum of the distances L, D and the instantaneous value of X.

The pulse generator 39 is connected to the gate 44 to supply a signal to the latter so as to allow the signal from the unit 41 to pass through gate 44 to a recording unit 45. Pulse generator 39 is operated to supply this signal to the gate 44 only when the value of the signal to the pulse generator 39 is decreasing, i.e. when the trailing edge 30b of the plate 30 is in the scanning zone 33 of the unit 31. Thus the recording unit 45 produces a record of the total length of the plate when the latter condition is satisfied and when the leading edge 30a passes below one or other of the fixed sensors. It will be appreciated that since the length of the scanned zone 33 along the plate 30 is equal to the distance D, the recording unit 45 will only record the length of the plate once in every rolling pass.

Any convenient number of fixed photosensors may be provided, the number depending on the desired variation in plate length. Further fixed sensors (not shown) may be provided to the left of the unit 31 (as seen in FIG. 2), so that the plate may be measured also when moving from right to left as seen in that figure.

The length-measuring apparatus including the measuring unit 31 and fixed photosensors in combination may incorporate any suitable recording unit, supplied with input signals from any suitable electronic circuit, that described with reference to FIG. 2 being one example.

What is claimed is:

1. Measuring apparatus for measuring a linear dimension of a body, comprising a rotatable first reflecting means for scanning a linear path on the body including said dimension and for reflecting a beam of a first radiation from said body, first sensing means arranged in view of said first reflecting means so as to receive said beam of first radiation reflected therefrom when said reflecting means rotates and adapted to produce an electrical output signal in response thereto so that said output signal is a continuous signal so long as said beam or first radiation is received by said first sensing means, a rotatable second reflecting means synchronised with said first reflecting means, a radiation source for transmitting to said second reflecting means a continuous beam of a second radiation at the same angle of incidence at all times as that of said beam of first radiation on said first reflecting means, second sensing means arranged in view of said second reflecting means so as to receive said second radiation reflected therefrom when said reflecting means rotate and adapted to produce an electrical reference signal in response thereto, a screen so arranged between said second reflecting means and second sensing means that the angle of incidence of said beam of second radiation on the screen is always the same as the angle made with said body by said beam of first radiation, said screen having alternate equally-spaced opaque and translucent lines thereon transverse to said linear path on the body, so that as said reflecting means rotate, the screen is scanned by said beam of second radiation and produces alternate states of presence and absence of said second radiation between the screen and said second sensing means whereby said reference signal is a series of pulses resulting from said alternate states, each pulse representing an equal increment of distance scanned along said linear path on said body by said first reflecting means, first gate means having inputs connected to said first and second sensing means and an output connection for transmitting said series of pulses received from said second sensing means only when said first gate means receives said output signal from the first sensing means, and pulse-counting means for counting said pulses received thereby from said output connection of said first gate means, so that the pulses counted by the pulse-counting means constitute a direct measure of the length of said body along said linear path thereon.

2. Measuring apparatus according to claim 1, for use when said body is moving along said linear path, comprising means for limiting to a predetermined maximum value the distance along said linear path that can be scanned by said first reflecting means, a third sensing means fixed so as to view a point on said linear path disposed at a predetermined distance in the direction of movement of said body from the limit, nearest to said point, of said distance scanned by the first reflecting means, so as to produce an electrical output signal representing said predetermined distance when said point is on said body, first trigger pulse generating means for producing a first trigger pulse in response to the commencement of said output signal from said third sensing means, second gate means for receiving said pulses from said first gate means and to said first trigger pulse and arranged to transmit said pulses from the first gate means only on receipt of a said first trigger pulse, first adding means for producing an output signal, representing the sum of said predetermined distance and the distance along said path on the body scanned by said first reflecting means, by adding said pulses received from said second gate means with said output signal from the third sensing means, second trigger pulse generating means responsive to said pulses from said first gate means, for producing a second trigger pulse when the number of pulses transmitted by said first gate means decreases on successive cycles of rotation of said first reflecting means, and third gate means responsive to said second trigger pulse for transmitting the output signal received by said third gate means from said first adding means only on receipt of said second trigger pulse.

3. Measuring apparatus according to claim 2, comprising a plurality of said third sensing means equally spaced in the direction of said linear path and each viewing a different point on said path, and second adding means for receiving the output signals from all the said sensing means and for transmitting an output signal to said first trigger pulse generating means and to said first adding means, representing the sum of said predetermined distance along said path together with the sum of the distances between each said third sensor viewing a point on said body and the next one also viewing a point on said body.

References Cited

UNITED STATES PATENTS

| 2,659,823 | 11/1953 | Vossberg | 250—219 |
| 2,848,921 | 8/1958 | Koulikovitch | 250—219 |
| 2,941,086 | 6/1960 | Gottschall et al. | 250—219 |
| 3,003,066 | 10/1961 | Snavely | 250—219 |
| 3,066,226 | 11/1962 | Lindstrom | 250—219 |

WILLIAM F. LINDQUIST, *Primary Examiner.*

RALPH G. NILSON, *Examiner.*

M. A. LEAVITT, *Assistant Examiner.*